United States Patent [19]

Andelfinger

[11] Patent Number: 5,737,908
[45] Date of Patent: Apr. 14, 1998

[54] CUTTING MACHINE PARTICULARLY FOR USE IN THE PRUNING OR PREPRUNING OF TRELLISED VINES

[75] Inventor: Georges Andelfinger, Niederhergheim, France

[73] Assignee: Binger France Sarl, Niederhergheim, France

[21] Appl. No.: 512,976

[22] Filed: Aug. 9, 1995

[30] Foreign Application Priority Data

Aug. 11, 1994 [FR] France .................. 94 10059

[51] Int. Cl.⁶ .................................................. A01D 55/18
[52] U.S. Cl. ........................ 56/235; 56/14.9; 56/255; 144/34.1; 47/1.43; 47/58
[58] Field of Search ........................ 47/1.43, 58; 56/13.6, 56/14.3, 14.7, 14.9, 15.2, 15.3, 233, 234, 235, 255, 327.1, 503; 144/34.1

[56] References Cited

U.S. PATENT DOCUMENTS

| | | | |
|---|---|---|---|
| 2,532,174 | 11/1950 | Lieberman | 56/255 |
| 4,174,601 | 11/1979 | Griffin | 56/503 |
| 4,383,400 | 5/1983 | Mead et al. | 56/233 |
| 4,397,136 | 8/1983 | McLeod | 56/503 |
| 4,459,796 | 7/1984 | Stokes | 56/14.3 |
| 4,733,525 | 3/1988 | Pellenc et al. | 56/235 |
| 4,860,808 | 8/1989 | Le Clerc De Bussy | 144/34.1 |

FOREIGN PATENT DOCUMENTS

| | | | |
|---|---|---|---|
| 0147344 | 7/1985 | European Pat. Off. . | |
| 1290944 | 4/1902 | France | 56/234 |
| 2283629 | 5/1976 | France | 56/235 |
| 2576481 | 8/1986 | France . | |
| 2635251 | 2/1990 | France . | |
| 2670079 | 6/1992 | France . | |
| 4037590C1 | 1/1992 | Germany . | |

OTHER PUBLICATIONS

European Search Report dated Nov. 7, 1995.

*Primary Examiner*—W. Donald Bray
*Attorney, Agent, or Firm*—Foley & Lardner

[57] ABSTRACT

A pre-pruning machine for trellised vines comprises a cutting module featuring superimposed tools each consisting of a cage and a cutting organ, and a feeding module consisting of superimposed feeding discs, it being possible to swivel the supports holding these modules by the action of a jack so that the said modules may interpenetrate each other in working phase. According to the invention, at least the motor of the cages is submitted to a slide drive limiting the torque, which is adjustable by the action of a pressure limiter (131; 133) within a calibrated range and selected by the operator in function of the working conditions (pruning type, advancing speed, etc.). Preferably, the motors of the cutting organs, feeders and cages are connected in series, the opening/closing device by means of the jack is connected in branch-off upstream of the feeder motor, and the feeder motor is also connected to a pressure limiter (131). When, for example, an obstacle is encountered, the motor of the cage module will "slide", thereby avoiding all damage. The rotation speeds of the feeders and the cages are adjusted by means of the device (131). In interpenetration phase, in an evacuation zone of severed shoots, the tangential components of the feeder rotation speeds are higher than the tangential components of the cage rotation speed, so as to ensure proper evacuation from the trellised wires of the shoots attached to the said wires by their tendrils.

23 Claims, 10 Drawing Sheets

CUTTING MACHINE PARTICULARLY FOR USE IN THE PRUNING OR PREPRUNING OF TRELLISED VINES

FIELD OF THE INVENTION

This invention relates to a cutting machine particularly for use in the pruning or pre-pruning of trellised vines and comprising at least one cutting head each presenting two modules (30, 40), one of which is a cutting module (30) comprising a plurality of cutting tools (32) superimposed and positioned around a shark (31A) of axis (31) the other module being either a cutting module (30) comprising a plurality of cutting tools superimposed, or a feeding module (40) comprising a plurality of feeding tools (42) superimposed and placed around a shaft (41A) of axis (41), each superimposed tools of one module being located in a support which may swivel around an axis parallel to the axes of the module, each cutting tool comprising one external element, in the form of a cage suitable for a rotating movement and an internal element, housed within the said cage, this element consisting of an independent cutting organ (34) and driven in rotation by a motor (71), each feeding tool being in the form of a disc with peripheral teeth suitable for a rotating movement, the cages on the one hand and the feeding tools on the other hand being interdependent with each other and the cutting tools being able to interpenetrate in the corresponding spaces provided between the tools of the other module through the action of at least one jack or equivalent means.

Instead of and in place of the feeding module, it can be provided a second cutting module with the same features as those of the first module described above.

BACKGROUND OF THE INVENTION

Figure 1:
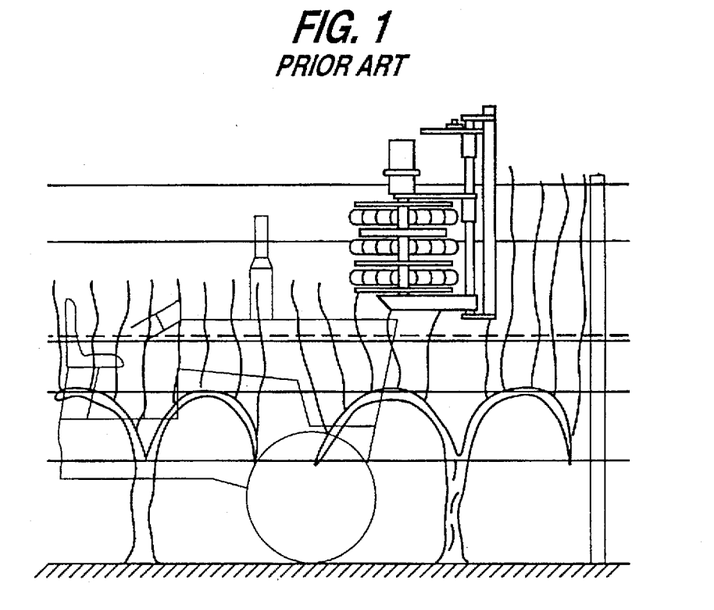
Figure 2:
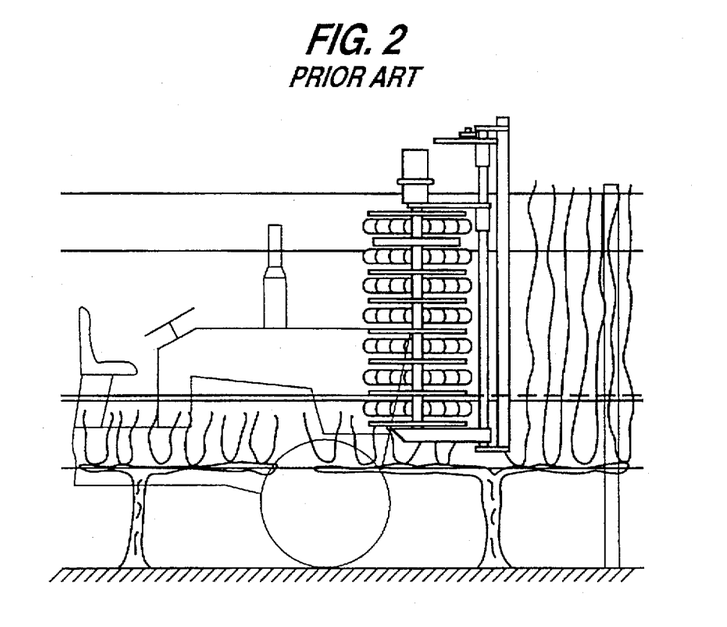

Before discussing the various problems involved, it should be remembered that there are various types of pruning for trellised vines. Among these, mention should be made of semi-arch or Guyot pruning (FIG. 1) and cordon pruning known as Royat (FIG. 2). It should also be known that pruning work takes place about 6 months before the wine harvest. In the case of Guyot pruning, the cutting level is relatively high, the shoots are supple and growth is generally limited and fairly regular. The use of cutting machines with vines pruned in this way is not too complicated (with the exception of possible difficulties discussed below). With cordon pruning, on the other hand, the cutting level is low (usually just above the lower wire), the main shoots or spurs are rigid and growth is dense and fairy irregular. It may readily be understood that effective, quality pruning in such circumstances is less straightforward and more complicated. The difficulty is compounded by the fact that proper care of these spurs is of vital importance, since breaking or damage will have serious consequences on the future yield of grapes.

Moreover, and irrespective of the type of pruning, cutting machines often have to operate in difficult conditions caused by the relief (uneven terrain) and/or the presence of all kinds of obstacles (other than the stakes), e.g. stumps, or/and in particular unsatisfactory trellising (slack or rusty wires, wires at the limit of mechanical elasticity, etc.).

The problems encountered, and the objects that need to be achieved, with this kind of cutting machine are both numerous and varied:

Care for posts (canes, metal or synthetic posts), wire stretchers, and wires;

User-friendliness and reliability: optimum automation, safety of use, reduced stress on the machine's mechanical parts;

Regular feeding;

Pulling away the cut shoots, i.e. extracting and clearing them from the trellising (the shoots tending to remain attached to the wires by their tendrils), without damaging the plants, posts and wires;

Special care required in dealing with the base of the spurs (carrier shoots) without compromising the shoot extraction operation (cordon pruning);

Thoroughness, quality and uniformity of cutting.

It should be emphasized that these objects—together with the more general need for the rational construction of a machine at reduced cost—are to be attained in all operating conditions (see above: pruning type, training, etc.).

The solutions to these problems, as also the quality of these solutions, are closely linked to the basic concepts governing the operation of the machine, i.e. to the methods or processes adopted, on the one hand in relation to cutting, and on the other hand in relation to the conformation and working of the moving parts.

Figures 3A, 3B:
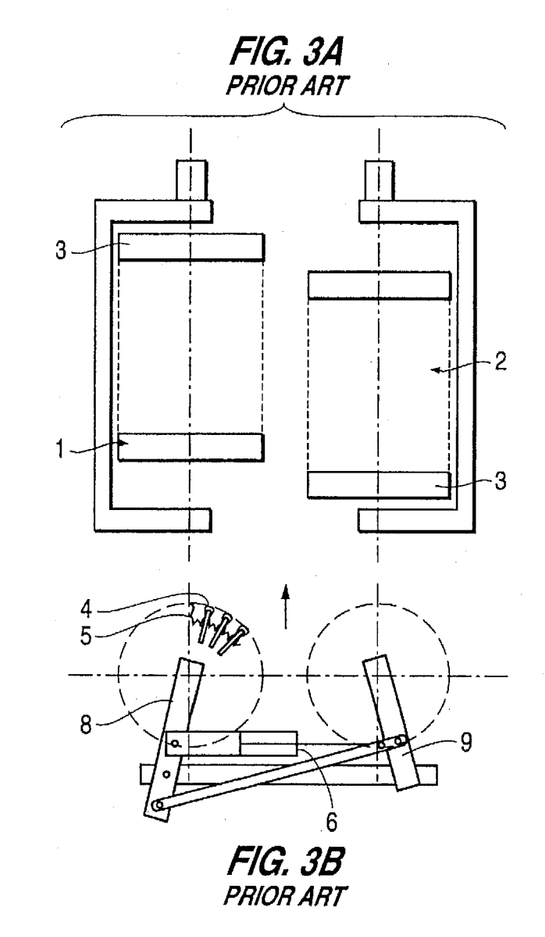

EP-0,147,344 discloses a cutting machine of the type defined in the introduction (hereinafter referred to as the Pellenc machine and represented in diagram form in FIG. 3A and FIG. 3B), presenting a cutting head with two identical cutting assemblies 1, 2 each comprising a stack of cutting tools 3 working with a shearing action. The cutting tool comprises two elements. The outer element 4, known as the cage, consists of a disc with peripheral teeth and with radial ribs welded on each side of the disc, the number of ribs on each side being equal to the number of teeth, a rib extending each time from the central zone to the extremity of the corresponding tooth; it is submitted to a continuous rotation movement and fulfills the function of a blade and, in theory, the function of protection. The inner element 5 is a disc presenting teeth on part of its periphery; it is pinned against the disc of the outer element and fulfills the function of a counterblade. The tools of one assembly can interpenetrate the spaces provided between the tools of the other assembly, the opening of the assemblies 1, 2 being activated by a jack 6 controlled by the operator, and the supports 8, 9 being activated by the return springs.

The drawbacks associated with this machine may be explained as follows: in the first place, the shearing cut requires a very high drive torque applied to the outer element, the cage. Secondly, the protective functions which the cage is required to fulfill—protection of posts (in particular, posts of small cross-section), wires, wire stretchers and the inner element—cannot be fulfilled satisfactorily for three reasons: firstly, this cage is directly involved in cutting (blades) despite the fact that it is in contact with wires, in particular; secondly, a corollary of the previous point, the cage must, as we have already seen, at all times be driven at a high torque, and finally, by virtue of its conformation, it is not a closed element, either at its periphery, at its bottom or at its top.

It follows that the performance of the Pellenc machine fails to give satisfaction. First of all, frequent damage is caused to the posts and wire stretchers, the wires tend to "concertina" or break, and even the cutting tools are subject to damage from the wire. The frequency of these mishaps increases considerably when, as often happens, the vegetation gets tangled up in the wiring. Secondly, with this machine, the severed shoots are either poorly extracted or not extracted at all from the wires whenever the tangential component of the disc rotation speed of the cage is essentially, and inevitably with this machine, equal to the running speed (e.g. cordon pruning).

Figure 4A:
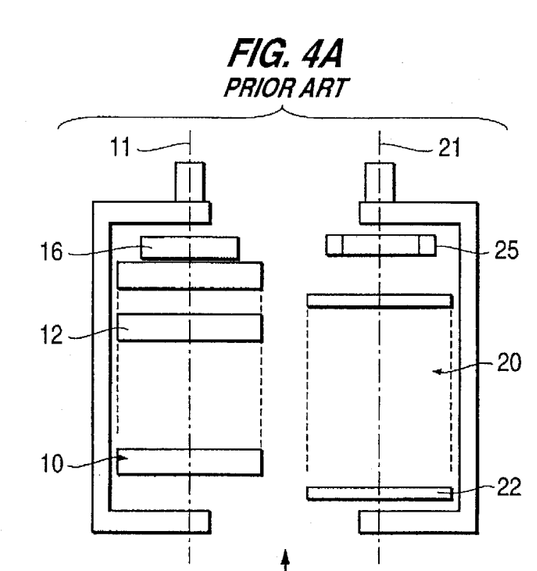
Figure 4B:
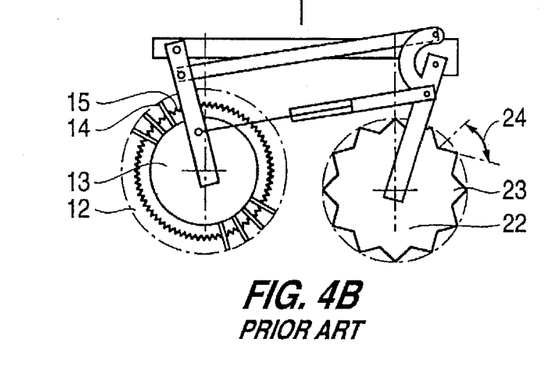

The machine described in DE-40 37 590 or FR-91 14502 (hereinafter referred to as the Binger Seilzug machine as represented in diagram form in FIG. 4A and FIG. 4B) is based on an entirely different concept, making it possible to reduce the disadvantages of the Pellenc machine, but still not in an altogether satisfactory manner.

The Binger Seilzug cutting machine provides a cutting head with two, non-identical units 10, 20 with an interpenetrative function. One unit 10 comprises a stack of cutting tools 12, the other 20 a stock of feeding tools (hereinafter designated feeders).The cutting tool comprises two elements. The outer element 13 is a cage made up of two discs linked at their periphery by U-shaped arches 14; this element is subjected to free rotation drive and fulfills a protective function (posts, wires, wire stretchers, internal element). The inner element 15 is a circular saw carrying out the cutting operation; it is enclosed by, and independent of, the cage and is rotation driven at a speed of approximately 1000 rpm. The feeder consists of a disc presenting toothing 23 at its periphery, the sides of these teeth being straight and set at an angle of 90°. The feeder unit is submitted to a continuous rotation drive. The assemblies 10, 20 are activated by an operator-controlled jack.

Depending on the degree to which they are open or closed, the units 10, 20 may work with each other through the intermediary of a frictional wheel 25 (provided with a rubber strip) and a wheel rim 16, placed respectively on top of assembly 20 and assembly 10.

Since there is a marked improvement in the protective functions of the cage, the risk of damage to posts, wires and wire stretchers is lower than with the Pellenc machine. However, the means adopted to control the movement of the free rotating cage are not ideal and give rise to other disadvantages. Indeed, it is observed that the mechanical elements are submitted to repeated, and therefore dynamic, stresses when the machine is used in conditions presenting a certain degree of difficulty. These stresses are the result of shocks produced whenever, during the closing of the two units (which is and must be fast), the wheel 25 comes violently into contact with the wheel rim 16 (first stress category), and there is instantaneous movement of the cutting unit 10 (second stress category). As the saws rotate at high speed during opening, the rotation movement of the cages accelerates sharply under the influence of the frictional force of the saw bearings, and then the cages are braked sharply by a brake shoe (not represented in FIG. 4A and FIG. 4B) (third stress category). Apart from the mechanical problems brought about by these stresses (rapid wear, mediocre reliability, short life-span), the control of cage movement is considerably hampered in freezing or wet weather, the considerable reduction in friction leading to the tearing of shoots. Other drawbacks may be traced, on the one hand, to the feeders, the conformation of the teeth causing part of the vegetation to slip, particularly when the said vegetation is dense, and on the other hand, to the cages, here again the conformation being such that, despite improvements compared to the Pellenc machine, the risk of damage to posts and wires cannot be entirely ruled out.

Finally, like the Pellenc machine, the Binger Seilzug machine has no device for treating the spurs with proper care and attention.

OBJECTS OF THE INVENTION

The purpose of this invention is to provide real and effective solutions to the problems discussed above and to eliminate all the disadvantages associated with machines of the prior art.

This object is achieved due to the means defined in the claims. The independant claims describing the particular means allowing the realization of the machine up to the invention in good conditions and an optimal way.

BRIEF DESCRIPTION OF THE DRAWINGS

There now follows a detailed description, by means of examples, of the embodiments of the cutting machine (hereinafter designated pre-pruning machine) according to the invention, illustrated by the appended drawings where FIGS. 1–4B show conventional cutting devices.

FIGS. 1 to 4 have been included in order to situate common fields of application for pre-pruning machines and to draw attention to the most recent inventions.

DETAILED DESCRIPTION OF THE INVENTION

Figure 5:
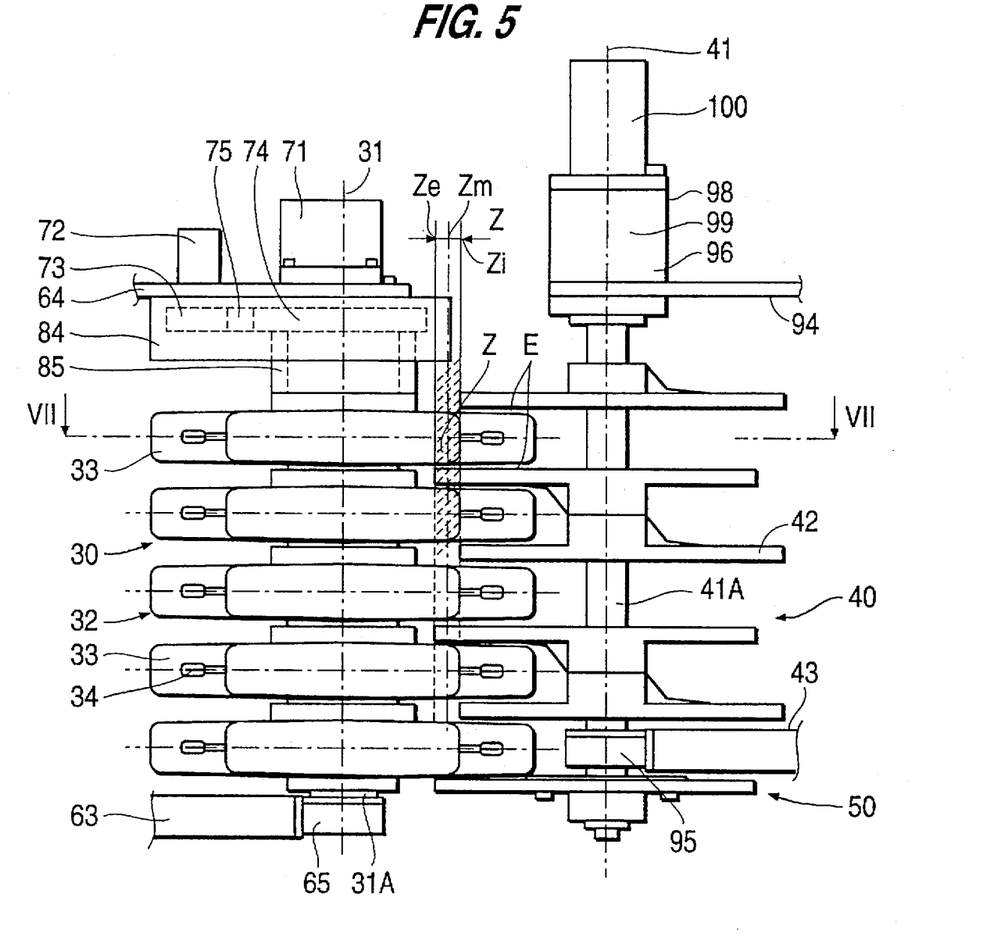
FIG. 5 shows a rear view, i.e. looking in a forward direction, of the cutting and feeder modules during the interpenetration phase.
Figure 6:
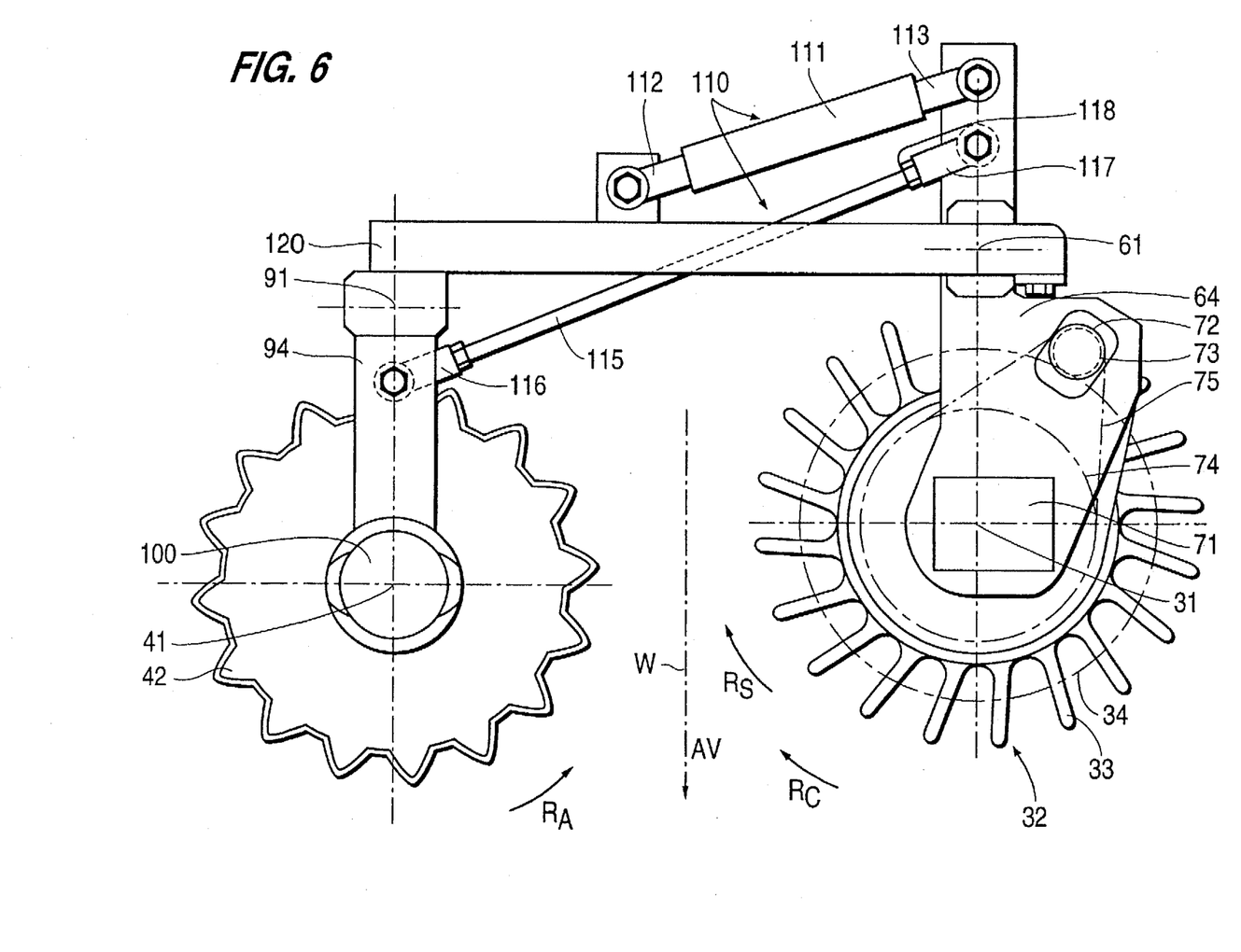
FIG. 6 represents an elevational view of the pre-pruning machine.

FIG. 5 and FIG. 6 present the pre-pruning machine which is to be fixed to the front right or lateral right side of a non-represented tractor. The forward direction of the pre-pruning machine is symbolized by the AV arrow on FIG. 6, whereas, in FIG. 5, the pre-pruning machine is seen from behind, the observer looking in the direction of the forward movement. A cutting module 30 of axis 31 and a feeding module 40 of axis 41 may be seen.

The cutting module 30 comprises a stack of cutting tools 32 on a shaft 31A, each tool 32 comprising an outer element, i.e. a cage 33 and an inner cutting element, i.e. a saw 34.

Figure 12:
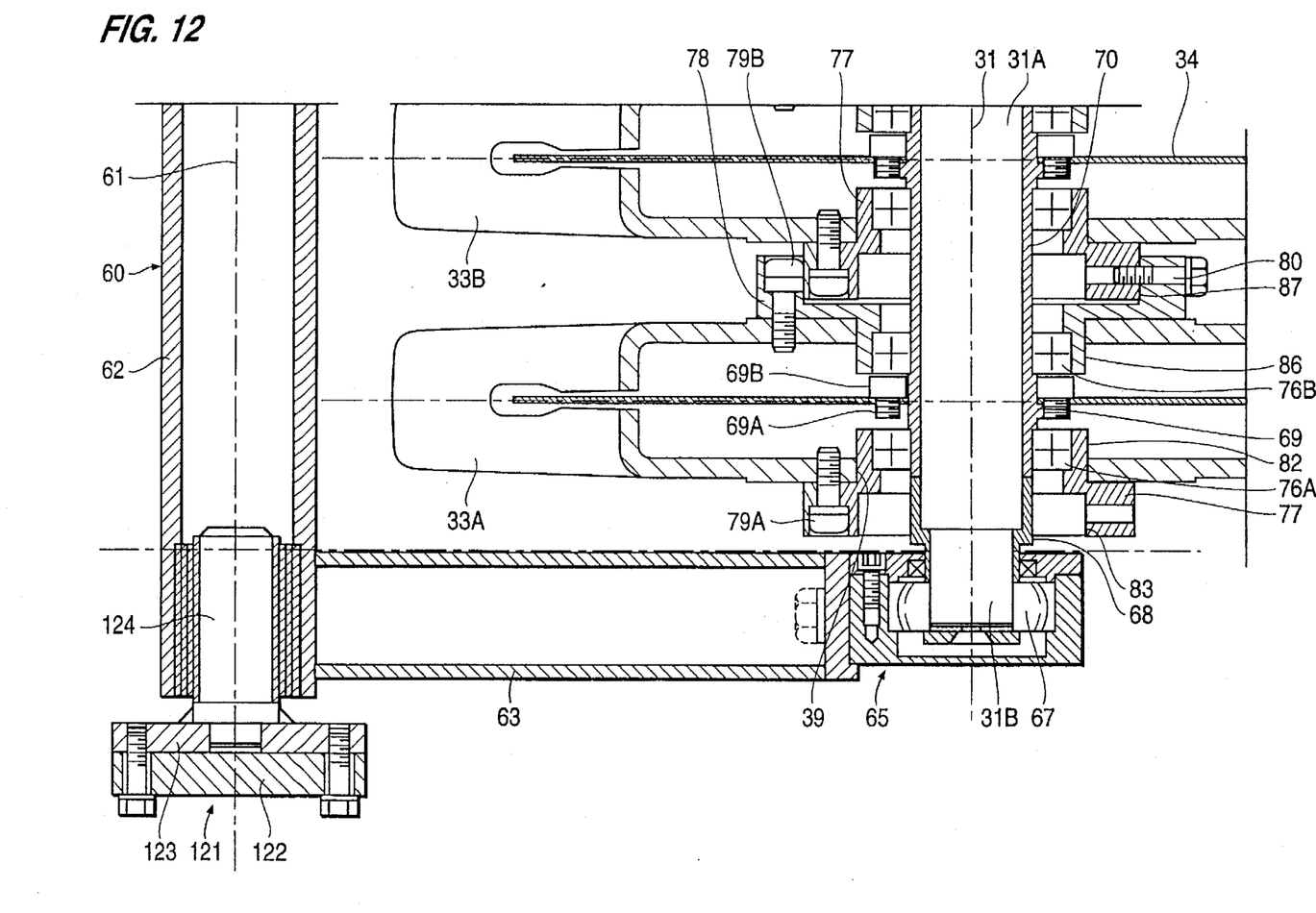
FIG. 12 is a cross-section of the lower part of the cutting module showing the stacking of the cages.

The cutting module is carried by a support 60 which may be swiveled around an axis 61 (FIG. 12). Only the bottom arms 63 and top arms 64 of the support 60 are represented in FIG. 5. (In FIG. 12 a column 62 linking these two arms is partially represented.)

The cages are submitted to a new and original drive which constitutes one of the key components of the invention and which will be described in detail hereafter: the drive torque is adjustable and adaptable to working conditions (pruning types, state of posts and trellising, nature of the terrain, etc.) by means of a hydraulic safety device, for example by sliding. The cages are driven by a hydraulic motor 72 driving a gear 74 through the intermediary of a belt 75; the saws are driven by a motor 71. The rotation directions of the cages and the saws are symbolized by the arrows Rc and Rs in FIG. 6. The two motors 71, 72 are attached to the arm 64 of the support 60.

The feeding or channeling module 40 comprises a stack of feeding tools 42 (or feeders 42) on a shaft 41A, each of these tools 42 being in the form of a disc.

The feeding module 40 is held by a support 90 which may be swiveled around an axis 91. Only the bottom arms 93 and top arms 94 are represented in FIG. 5. (In FIG. 11 a column 92 linking these two arms is partially represented.)

The feeders 42 are submitted to a rotation drive, either of standard, i.e. continuous type, or preferably of a type similar to that provided for the cages. According to the described example, this drive is supplied by a hydraulic motor 100 attached to the arm 94 of the support 90, the direction of rotation being symbolized by the arrow Ra in FIG. 6.

It may be seen that the basic feeding module 40, formed by the stacking of feeders between the two arms 93, 94 is completed by a device 50 disposed on the other side of the arm 93. The description and the significance of this device will be given with the help of FIG. 11.

The two supports 60, 90 are in turn connected to an inverse U-shaped chassis whose upper horizontal cross-piece (120) is illustrated in FIG. 6. The parallel side-frames of this chassis, stretching out in parallel, one in the proximity of the column 62 of the support 60, the other in the proximity of the column 92 of the support 90, are not represented.

Each of the terminal parts of the parallel side-frames of the chassis is provided with a swiveling device 121, known in the art (FIG. 12). This device comprises a plate 122 integral with the chassis. To this plate is fixed a flange 123 incorporating a swivel axis 124 in such a way as to allow the previously mentioned swiveling of the supports 60, 90 around axes 61 and 91 respectively.

The swiveling of the supports around axes 61, 91 allows the modules, in the course of operation, to move away from the working axis W (FIG. 6) (essentially corresponding to the row of vines to be pre-pruned/pruned), and to approach the said axis W to the point of going past it, so that the two modules may interpenetrate, as represented in FIG. 5.

The supports 60, 90 are activated by means of a device 110 comprising a double-effect jack 111 and a tie rod 115, so as to allow opening movements (the moving away of the modules in relation to the axis W) and closing movements (the modules approach and, depending on the case, cross the axis W).

The jack 111 is connected by one of its rods 112 to the cross-piece 120 of the chassis and by the other rod 113 to the upper arm 64 of the support 60 of the cutting module 30. One of the ends 117 of the tie rod 115 is connected to this same arm 64, the other extremity 116 of the tie rod being connected to the upper arm 94 of the support of the feeding module 40. It is quite clear, from scrutiny of FIG. 6, that the closing of the cutting module 30 is brought about by the outward thrust of the rod of the jack connected to arm 64, a thrust which will cause the outward movement of part 117 and, correlatively, the movement of the feeding module 40 towards axis W.

Each extremity of both the jack 111 and the rod 115 comprise a joint and a device for adjusting the length of the said jack and the said rod, the joints being threaded on one length. There are no specific references for joints, threads and adjustment locking means. This device known in the art is symbolized in FIG. 6 only by the representation of locking nut 118 on the rod 115. The advantage of this adjustment is that the desired inward or outward movement of the cutting modules 30 and the feeders 40 of axis W can be adapted according to the density of the vegetation.

FIG. 5 shows that the lower/upper edge of a tool from one module is separated from the upper/lower edge of a corresponding tool from the other module, by an average distance marked E. The significance of this parameter will be discussed hereinafter.

Figure 7:
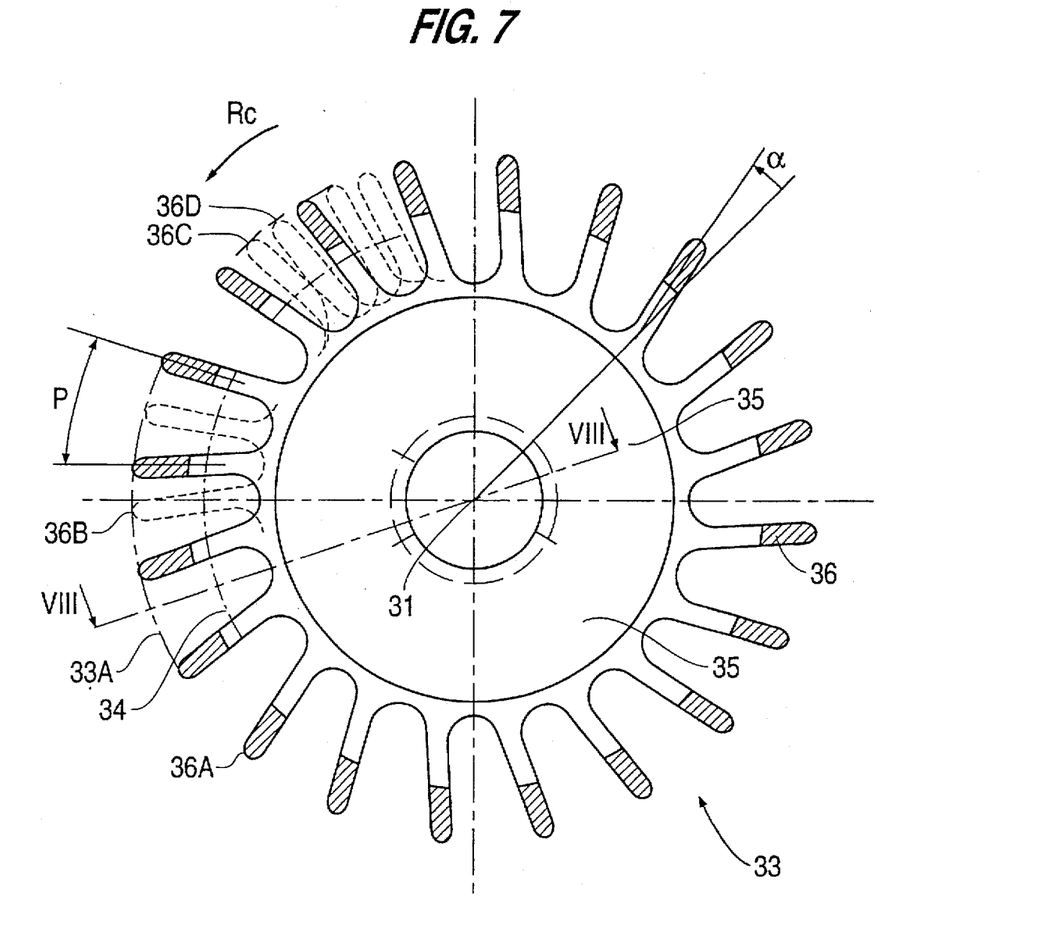
FIG. 7 is a cross-section of the cage along an axis VII—VII of FIG. 5.
Figure 8:
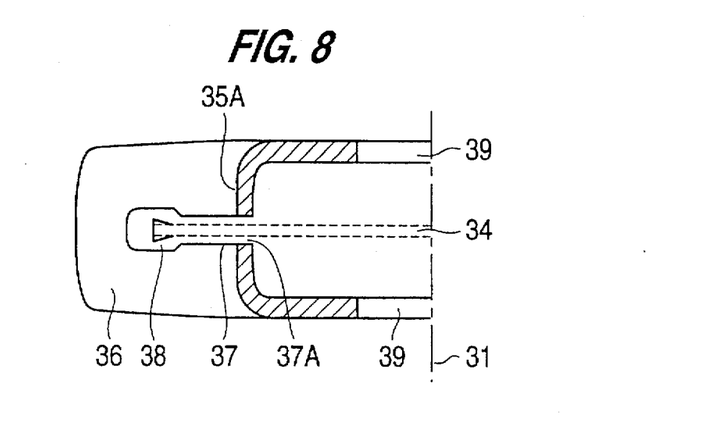
FIG. 8 is a half-section of the cage along an axis VIII—VIII of FIG. 7.

FIG. 7 represents a cross-section view, according to axis VII—VII of FIG. 5, of a circular cage 33 fitted on the bottom and top with central openings 39 and equipping the cutting module 30, this cage housing the saw 34 symbolized in this figure by its dot-and-dash line. FIG. 8 is a half-section, according to axis VIII—VIII of FIG. 7. The cage 33 is made up of two half-shells 35 whose edge 35A, extending quasi-parallel to axis 31, presents a median axial slit 37A and is prolonged by full blades 36. These blades may be oriented radially or, preferably, quasi-radially. They are relatively thick and their extremity 36A, when seen from a plan view, is rounded. They present a median slit 37 in which the saw 34 may work, the terminal zone of these slits being flared. The flaring 38 is included for two reasons: firstly, to allow space for the path (slight alternate distance of the teeth) of the saw toothing. Secondly, for safety reasons, the flaring eliminates any risk of damage to the blades 36 and the saw 34 itself when, for example as a result of soil erosion, the vegetation in the cage, i.e. between the blades 36, acts on the saw to the extent that the sides of the said saw may even touch one or other of the sides (not specifically numbered) of the slits 37.

It may be observed that the blades of the cages are shifted, in relation to the radial orientation, by an angle a in the rotation direction Rc. This angle facilitates, in the first instance, the "grasp" of the vegetation which is to be cut immediately by the saws, and then the evacuation of the severed shoots, in combination with the special feature concerning the relation between the rotation speeds of the cages and the feeders (see below).

The blades of a cage may be shifted either by a half-pitch (the pitch bears the reference P in FIG. 7) in relation to the blades of the following cages (blades 36B of an adjacent cage), or by a third of a pitch (blades 36C of a cage adjacent to that represented by a full line and blades 36D of a cage adjacent to the cage whose blades are numbered 36C). One or other of these arrangements will be preferred depending on the cross-sections of the posts.

Figure 9:
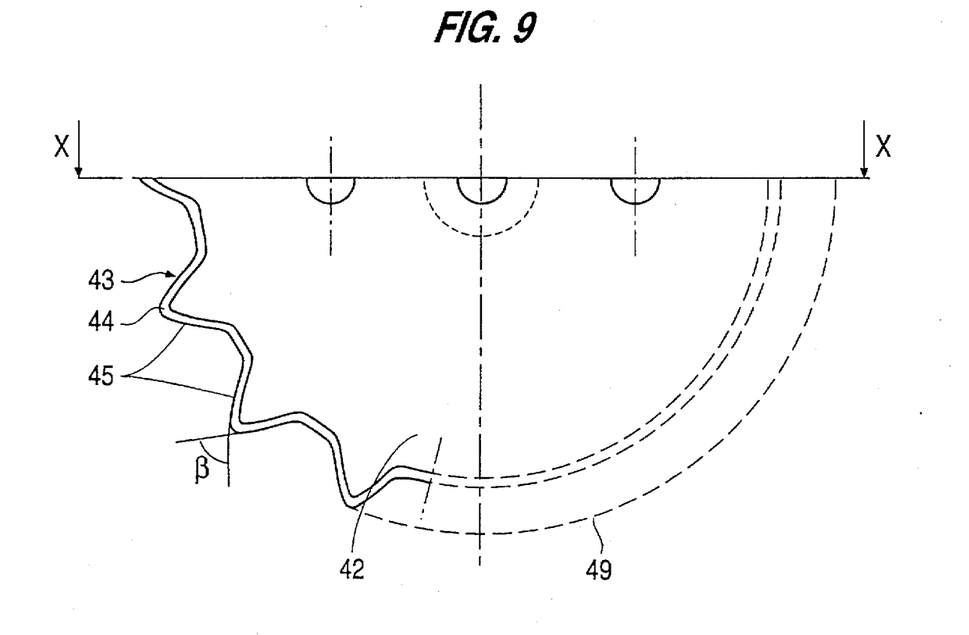
FIG. 9 is a partial plan view of a feeder.
Figure 10:
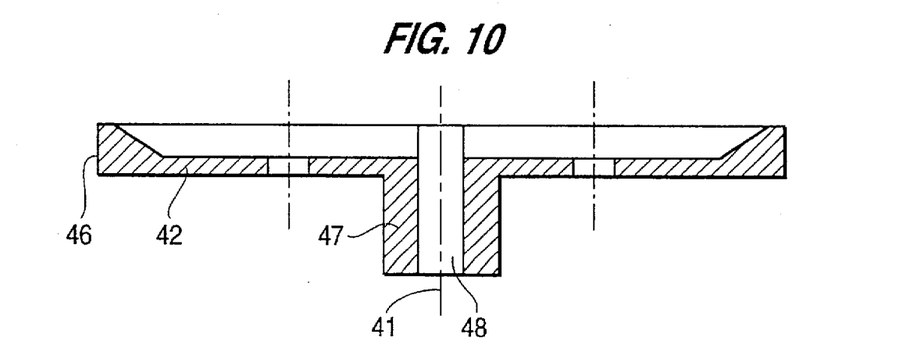
FIG. 10 is a half-section of the feeder along an axis X—X of FIG. 9.

FIG. 9 represents a half-plan view of the feeding tool 42 equipping the module 40, FIG. 10 being a half-section according to axis X—X of FIG. 9.

The feeding tool 42 is in the form of a disc comprising in its central zone a hub 47 and a bore 48, and at its periphery, a peripheral toothing 43 with a special feature in that this toothing presents a profile which is globally similar to that of a gear. The sides 45 of the teeth are slightly curved, the tops are rounded and the angle b is less than 90° (advantageously in the region of 80°). The teeth (reference 46 in FIG. 10) are relatively thick; in the example, thickness is approximately 15 mm. The edges 46 are parallel to the rotation axis 41. This profile has the advantage of combining a certain minimum aggression, necessary and sufficient to ensure a firm grasp of the vegetation, with an adequate "filling" capacity without causing any damage to the posts, wire stretchers and wires and at the same time helping to ensure that the severed shoots are properly evacuated.

Figure 11:
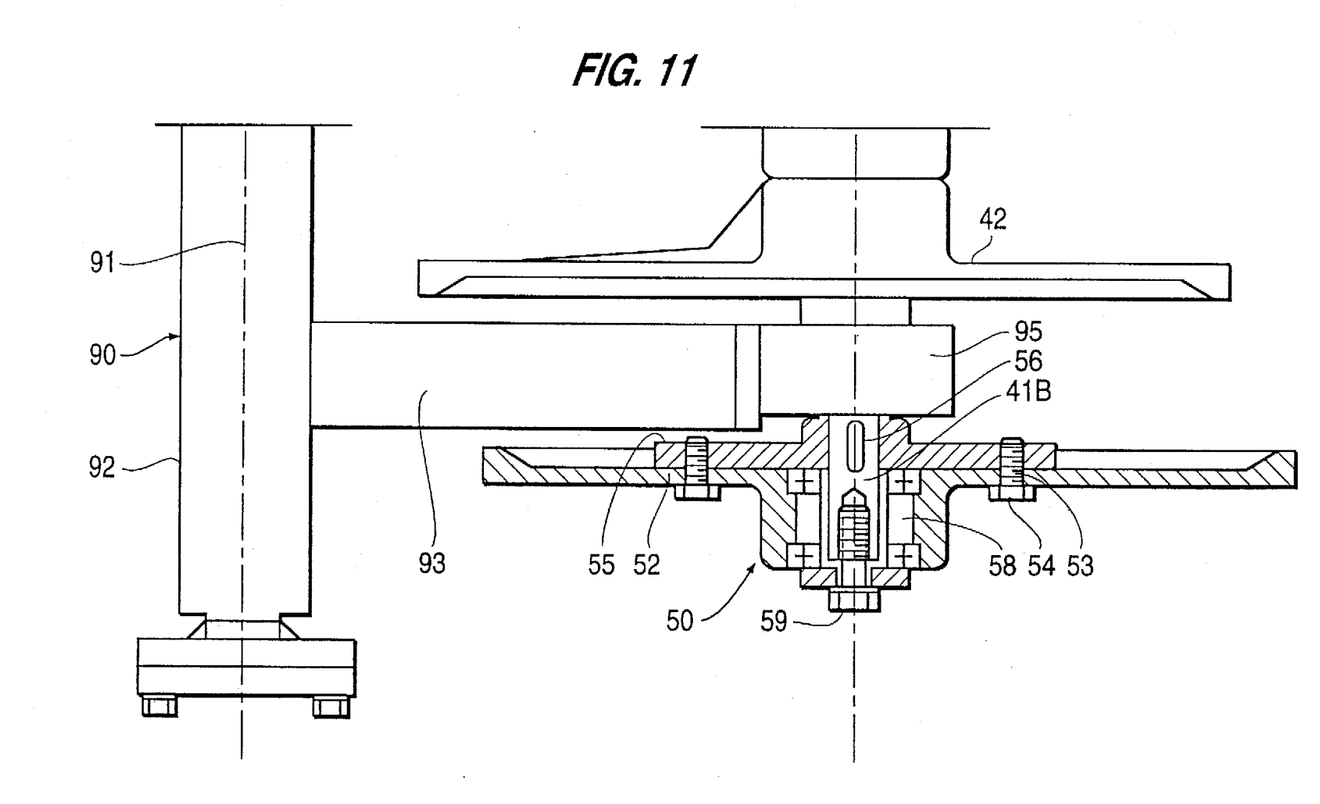
FIG. 11 is a cross-section of a device designed to tend the main spurs.

FIG. 11 represents the lower device 50, another component of the invention, capable of completing the basic feeding module 40 and comprising a disc 52, similar to disc 42 but featuring a bore 58 which is larger than the bore 48 of disc 42, and holes 53. This disc carries out a special protection function. Naturally, depending on the possible variations, the disc 52 might present a profile which differs from that of a disc 42. Any other form of tool may also be envisaged instead of and in place of a disc 52.

The disposition of the feeding module 40 itself does not call for particular explanation: the shaft 41A is guided by two blocks 95 and 96 attached to the end of arms 93 and 94 and is axially linked. The feeders are stacked on the shaft 41A, linked in rotation and axially with the said shaft according to known methods, the feeders being successively positioned as shown in FIG. 5. The feeders are driven in rotation by the action of the motor 100 linked to the shaft 41A. The transmission of this movement is carried out according to known methods which do not warrant detailed description (in the example, transmission is by means of a coupling 99 housed in a protective sleeve 98 (FIG. 5)).

A portion 41B of the shaft 41A protrudes from the lower block 95. A flange 55 is fitted onto the end 41B of the shaft, this said flange being rendered interdependent of the said end 41B by means of a key 56. The disc 52 is rendered interdependent with this flange by fastening means 54; it is fitted on two bearings 57. The assembly is held by means 59. Thus, this disc 52 is either submitted to the drive of the shaft 41A when it is locked with the flange 22, or in free rotation when it is freed from the said flange, the screws 54 having been removed. Moreover, the disc may easily be concealed, i.e. removed by withdrawing it from underneath after loosening the screw 59.

This device is particularly useful when the machine is operating with cordon-type vines. Its faculty of totally free rotation treats the spurs gently and does not injure them, whilst the extraction of the severed shoots is ensured by the rotation of the upper feeder discs of module 40, which said discs remain submitted to the rotation drive according to specific features described hereinafter.

According to a variation, instead of the described arrangement, provision could be made for at least one feeding disc, whether or not similar to disc 52, to be incorporated in the module 40, that is to say that the removable disc or discs are housed just above arm 93. In this case the disc(s) would not be retractable. Finally, it should be noted that a device 50 such as described herein may be envisaged on pre-pruning machines whose cutting head is composed only of cutting modules or assemblies.

FIG. 12 represents the lower part of the cutting module, essentially with an original device linking the cages 33 to each other and the lay-out of the saws 34. For the purposes of this explanation, two cages 33A and 33B will be considered.

Before proceeding with the explanation, it should be recalled that the drive of the cages and the saws is carried out respectively by motors 72 and 71, both fixed on arm 64 of support 60 (FIG. 5 and FIG. 6). The shaft 31A is directly connected to the motor 71 by means of a (non-represented) coupling housed in a carter 84, according to construction variations known in the art. The motor 72 drives the cages 33, a particular feature being that the drive is indirect, the gear being driven by a pulley placed under the motor 72, by means of the belt 75. The upper cage is in turn driven by the gear 74 by means of a cross-member locked both to the gear 74 and the said upper cage. Here again, these constructions are known to professionals.

FIG. 12 shows the lower extremity 31B of the drive shaft 31A of axis 31 resting in a block 65, block and shaft 31B being linked by a beating 67. A padded ring 68, interdependent with the shaft 31A, rests by its lower base on the inner ting of the bearing 67. The upper base of this padded ring rests on a saw-holder hub 69, also interdependent with the shaft 31A through a means of interdependence known in the art. The hub 69 presents a flange 69A on which the saw 34 is rested, which said saw is attached to the hub by means of screws 69B. The (identical) bearings 76A and 76B are positioned on either side of this flange, the inner ring of which said bearings being each time interdependent with the hub 69. Each saw-holder hub is separated from the following hub 69 by a cross-member 70.

A block 77 and a block 78 are positioned on either side of the cage 33A, respectively on the lower side and the upper side.

The block 77 is graduated: it presents a projection 82 and a recess 83. It is inserted in the lower opening 39 of the cage 33A by its projection 82 and lies on the lower side, here flat, of the shells mentioned above. Lastly, this block 77 is interdependent with the outer ring of the lower bearing 76A (it being recalled that the inner ring of this bearing is interdependent with the saw-holder hub 69) and attached to the cage 33 by means of the screw 79A.

Similarly, the block 78 is graduated: it presents a projection 86 and a recess 87, the diameter of the recess corresponding to the external diameter of the block 77. It is inserted in the upper opening 39 (upper and lower openings bearing the same reference 39, cf. FIG. 8) of the cage 33A by its projection 86 and lies on the upper side, here flat, of the shells mentioned above. Lastly, this block 78 is interdependent with the outer ring of the upper bearing 76B (it being recalled that the inner ring of this bearing is interdependent with the saw-holder hub 69) and attached to the cage 33A by means of the screw 79B.

A "block 77—bearing 76A" assembly, corresponding to the description given above, is fitted on the lower side of the cage 33B. This new block 77 fits into the recess 87 of the block 78 of the cage 33A, and the said blocks 77, 78 are rendered interdependent by means of the screw 80.

The fitting of the following cages, i.e. in an upward direction, is carried out in the same way.

This ingenious arrangement provides a series of immediately apparent advantages: a rational construction eliminating the need for all superfluous elements such as crosspieces, simple and fast assembly, reduced costs, perfect transmission of rotation movement and extreme reliability.

An explanation will now be given of the principles and operating modes of the cutting module 30, of the feeding module 40 and of the supports 60, 90 holding these modules, with reference to the two kinds of arrangement represented respectively in FIG. 13 and FIG. 14.

Figure 13:
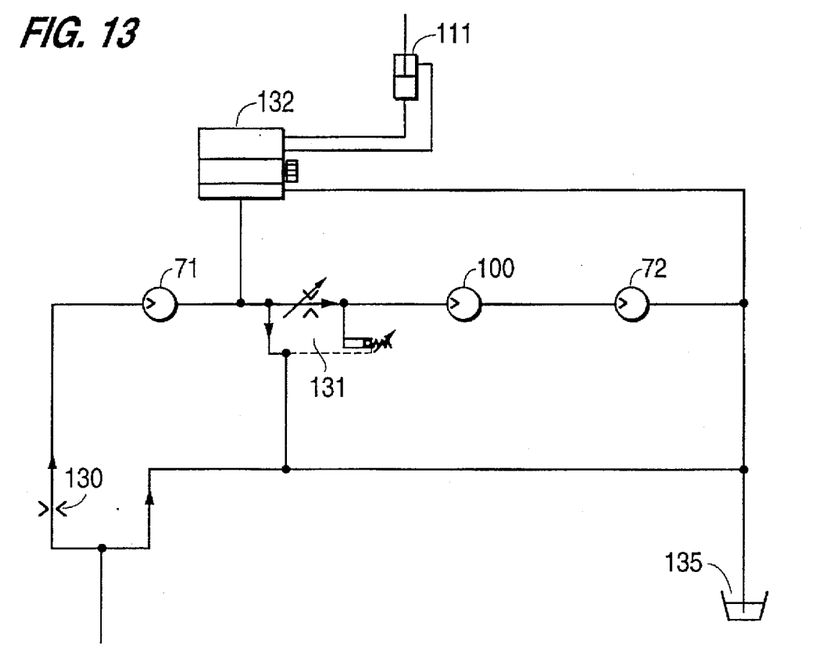
FIG. 13 is a connection diagram of the saw motors, feeders, cutting tools and jack.
Figure 14:
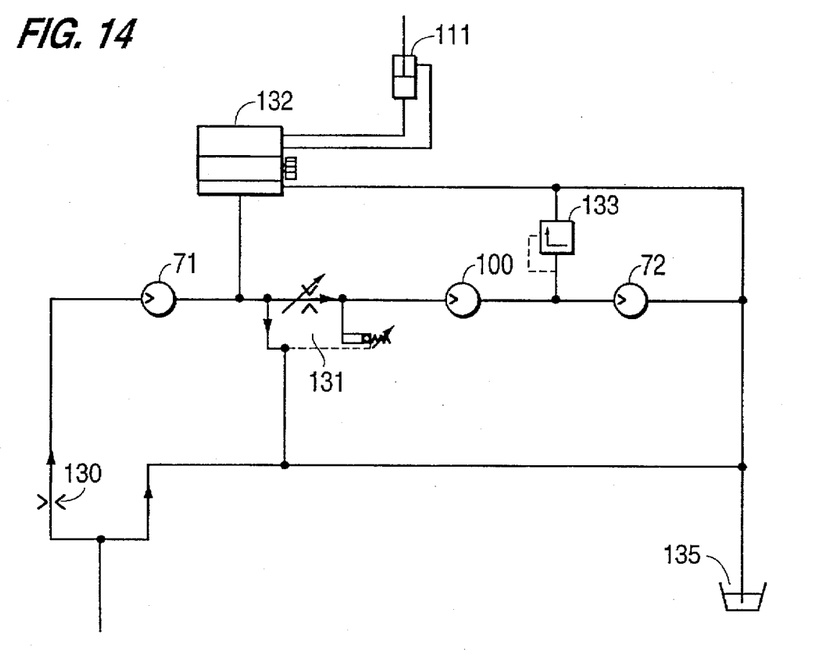
FIG. 14 is a diagram of a variation of the connection in FIG. 13.

Generally speaking, according to the invention, at least the cages of the cutting module, and preferably also the feeders 42 of module 40, are submitted to an adjustable torque drive, limited and adaptable to working conditions (especially vegetation density, type of pruning, speed rate), in conformity with the two arrangements represented in FIG. 13 and FIG. 14. Having come to terms with the unusual concept embodied in this kind of drive, by virtue of his powers of reflection and his inventive skills, the professional may envisage various sorts of devices such as hydraulic friction clutches, belt slip ("slide" drive), positive clutching, etc.. FIG. 13 and FIG. 14 represent particularly advantageous embodiments of hydraulic circuits.

In FIG. 13, the three hydraulic motors 71 (saws), 100 (feeders) and 72 (cages) are connected in series. This arrangement makes it possible to limit each of these motors to different and adapted pressures. According to the example, the sequence of this series corresponds to a usual pressure requirement of the said motors in essentially decreasing order.

The saws, connected to the hydraulic motor 71, are submitted to a rotation drive at a speed which will remain constant for a given setting, irrespective of the forward speed $V_A$ of the pre-pruning machine, so that the said saws will always, as they must, carry out the same work. As an example, a high rotation speed, of the order of 1500 rpm, will provide high quality cutting regardless of the cross-sections of shoots to be severed (cross-sections which, depending on the country and the region, may exceed 15 mm. in diameter). According to the variations, the motor 71 is connected to a variable flow control valve which the driver can maneuver or to a fixed flow control valve requiring no maneuvering from the driver. It is known that the usual working pressure of the saw motor is of the order of 50 to 60 bars.

A flow control valve with pressure limiter 131 is fitted upstream of the feeder motor 100. This valve makes it possible to adjust total admissible pressure, i.e. the torque on the feeder motors and on the motor of the cages, it being possible to choose the admissible sum of pressures Pa and Pc on the said feeders and the said cages respectively within a calibrated range (in order to ensure high-quality, safe and therefore damage-free work) lying, for example, between 50 and 100 bars. On the pre-pruning machine according to the invention, the usual working pressure on the motor 100 is in the region of 50 to 60 bars, and in the region of 20 to 35 bars on the motor 72.

There are essentially two reasons for the fact that the torque exerted on the cages is lower than that exerted on the feeders.

Firstly, the shoots, situated on either side of the wire 125 (see FIG. 15), in a zone which is designated 88 for the purposes of this explanation but which is of course impossible to mark accurately, are severed as soon as they come into contact with the saws 34 in such a way that the energy required of the cages to carry the shoots is kept to a minimum, while the feeders, which must grasp the vegetation in order to channel it towards the cutting tools 32 (cages 33 and saws 34) require a higher degree of energy.

Secondly, as will be seen later, the rotation speed of the feeders is higher than that of the cages. The latter will therefore benefit from an additional torque due to friction, supplied by the feeders and transmitted to the said cages via the vegetation.

This explains the preferred connection sequence of the two motors 100 and 72 in relation to the motor 71.

The jack 111 and an adjustable pressure reducer block 132 controlling the opening/closing of the said jack are connected in parallel to the outlet of the saw motor 71. The reducer block 132 is provided with an adjustable pressure limiter in such a way that the pressure Pv on the jack may be selected within a calibrated range (to ensure safety) capable of going up to a maximum pressure $Pv_{max}$ (e.g. calibration ranging from 12 to 100 bars). The choice of the Pv value will depend on the conditions in which the pre-pruning machine is required to operate, in particular the density of the vegetation and the type of pruning.

The arrangement according to FIG. 13 makes it possible to go round the posts in conditions of maximum safety, in other words without running the risk of damaging the said posts. The by-passing of the posts may be automatic or controlled.

In the first place, if, for example, the driver sets the control valve 131 to 60 bars and if the motor 100 (feeders) "absorbs" 40 bars, while the motor 72 (cages) requires 20 bars, the adjusted pressure (Pa+Pc=60 bars) is at the limit and both cages and feeders will continue to be driven. Let us now suppose that the driver has set the control valve 131 to 70 bars, that the motor 100 "absorbs" 40 bars (Pa=40 bars) and that the cages, functioning hitherto at a pressure of 20 bars, suddenly require (if they are to continue to be driven by motor 72) a higher pressure, for example 35 bars because they have come into contact with a post. This requirement will be met up to a level of 30 bars only (Pc=30 bars), as the admissible pressure limit of 70 bars has thus been reached; the shut-off (not indicated) of the control valve 131 will open and stay in the open position for as long as the "request" exceeds 30 bars (assuming that the feeders continue to operate at 40 bars), and the oil will be evacuated into the tank 135. The motor is said to "slide" ("sliding drive") and it is as though the cage module—or more accurately only the cages of this module—and the feeding module, which are going to pass over the vegetation by following and adopting the forward speed $V_A$ of the pre-pruning machine, were rotating freely. If there had been no torque limiter, by contrast, the post might have been destroyed due to the excessive drive torque of the cage motor, since the request for 35 bars would have been met. It is clear that the operator's choice of the maximum limit value of the said torque will be dictated by the conditions with which he has to contend (e.g. the type of pruning, the state of the posts and trellising, etc.). It is to be noted the cutting operation is not interrupted while the motors "slide". On the contrary, unless the operator deliberately halts the operation by maneuvering the means 130, cutting continues since the drive state of the saw motors is different from, and independent of, that of the cages and the feeders.

To take a second example of by-passing posts, this time in the context of Guyot pruning (low to average vegetation/supple shoots): the utilization value Pv is relatively low, as are Pa, Pc respectively 30 bars, 35 bars, 15 bars. When the feeding modules/cages encounter a post, providing by definition stronger resistance than the vegetation, the contact will cause an increase in the pressure of the circuit of the jack 111. The operator will have taken care so to set or display this pressure Pv means of the block 132 that this pressure is always less than or no more than the thrust exerted on the said modules. This adaptation and this balance will enable the modules to go round any obstacle (opening), particularly the post, by rolling over it without injuring it. This is achieved automatically, i.e. without the operator having to activate the block 132 manually.

In contrast, in Royat cordon-type pruning (dense vegetation/rigid shoots, high cutting level), the utilization values Pv, Pa and Pc are very high, in any event much higher than with Guyot pruning (in the region of 60 bars, 60 bars and 35 bars respectively). In this case, the driver will have to manipulate the electric open/shut control (block 132) himself. However, thanks to the adapted and separate adjustment of Pv, on the one hand, and of Pa and Pc, on the other hand (made possible by the arrangement according to FIG. 13), the chances of damage to the post are virtually nil, even if, due to a lapse of concentration, the driver should for example omit to activate the control 132 of the jack 111 in time.

The arrangement according to FIG. 14 is similar to that of FIG. 13, with the difference that a pressure limiter 133 is placed upstream of the cage motor 72. The three circuits—jack, feeders and cages—thus possess independent security, in that pressure Pc is adjustable, inside a calibrated range lying, for example, between 5 and 40 bars, independently not only of Pv but also Pa. This arrangement is particularly useful for pre-pruning machines operating with cordon-type vines, these machines being fitted in such cases with modules comprising a large number of stacked tools (e.g. ten per module). The arrangement according to FIG. 14 makes it possible to eliminate all remaining risks, it being possible to adjust Pv, Pa and Pc independently. In this way, protection of the cages and the post is ensured in all circumstances. Even a slight thrust exerted on a cage by an obstacle, will cause this cage, and thus the module, to roll, pressure Pc having been set to a relatively low value, less than or not exceeding Pa.

As an example, and accepting that the limiter 131 is set to 75 bars and that the limiter 133 is set to 35 bars, if the pressure on the motor 100 (feeders) is 40 bars and the pressure "requested" by the motor 72 is also 40 bars, the limiter valve 133 will open in such a way that Pc remains at no more than 35 bars, whereas the valve (not numbered) of limiter 131 will remain closed: only the motor 72 "slides", thereby adding considerably to working safety. It may be readily understood that, since the constraints exerted by the cages on posts, wire-stretchers and wire are appreciably higher than those caused by the feeders, it is a considerable advantage to be able to limit the cage motor torque independently, as is possible with the connection according to FIG. 14.

According to another embodiment (not represented by a figure), the motors 100 and 72 could be connected in parallel, downstream of the motor 71. The device 131, or a similar device, could be placed between the outlet of motor 71 and the branch-off of motors 100 and 72; then, at the branch-off, a flow divider could be placed, supplying separately the said motors 100 and 72. Upstream of each of these motors, a specific pressure limiter could be provided so as to limit the torque of each of these motors independently. However, this embodiment requires an additional element (flow divider at the branch-off point) and double the amount of oil. The previously described series connection is therefore to be preferred.

As we said in the introduction, the cutting head may comprise, according to a variant of enactment of the patent, two cutting modules 30 identical or quasi-identical (for the purposes of simplicity, the same references will be kept here for the second cutting module and for the units relating to it). That is to say that at least the cages 33 of one cutting module 30 connected to a motor 72, preferably also the cages 33 of the other cutting module 30 connected to another motor, submitted to a slipping drive which is therefore noncontinuous, more precisely, to a drive with an adjustable, limited and adaptable torque. In this case, the line connections for the motors and the ratings are made in a way analogous to those that have just been described in detail so that a man skilled in the trade will be able to carry them out easily, having seen the explanations supplied above. Hence, one will have the following sequence (series): reservoir, limiter 130, motor 71 for the cutting tools 34 of the first cutting module 30, limiter 131, motor 72 for the cages of the second module 30. The variant of parallel connection of motors 72 in relation to motors 71 and devices 130, 131, 133, in accordance with this variant of enacting the patent is easily deduced by analogy with the explanations in support of the form of enactment described in detail. Also are not the connections diagrams for these two cutting modules variant shown graphically.

While the device concerning the slide drive makes it possible to avoid all damage to posts, wirestretchers, trellis wires and the tools themselves, the problem of cleaning the wires persists, i.e. the problem of pulling and extracting from the wires the numerous shoots which have been severed but which are still firmly attached to the said wires by their tendrils.

According to the invention, this problem is overcome, principally, by a particular choice of cage and feeder speeds and, subsidiarily or additionally, by the definition of a parameter involving the space E (cf. FIG. 5) in interpenetration phase.

Figure 15:
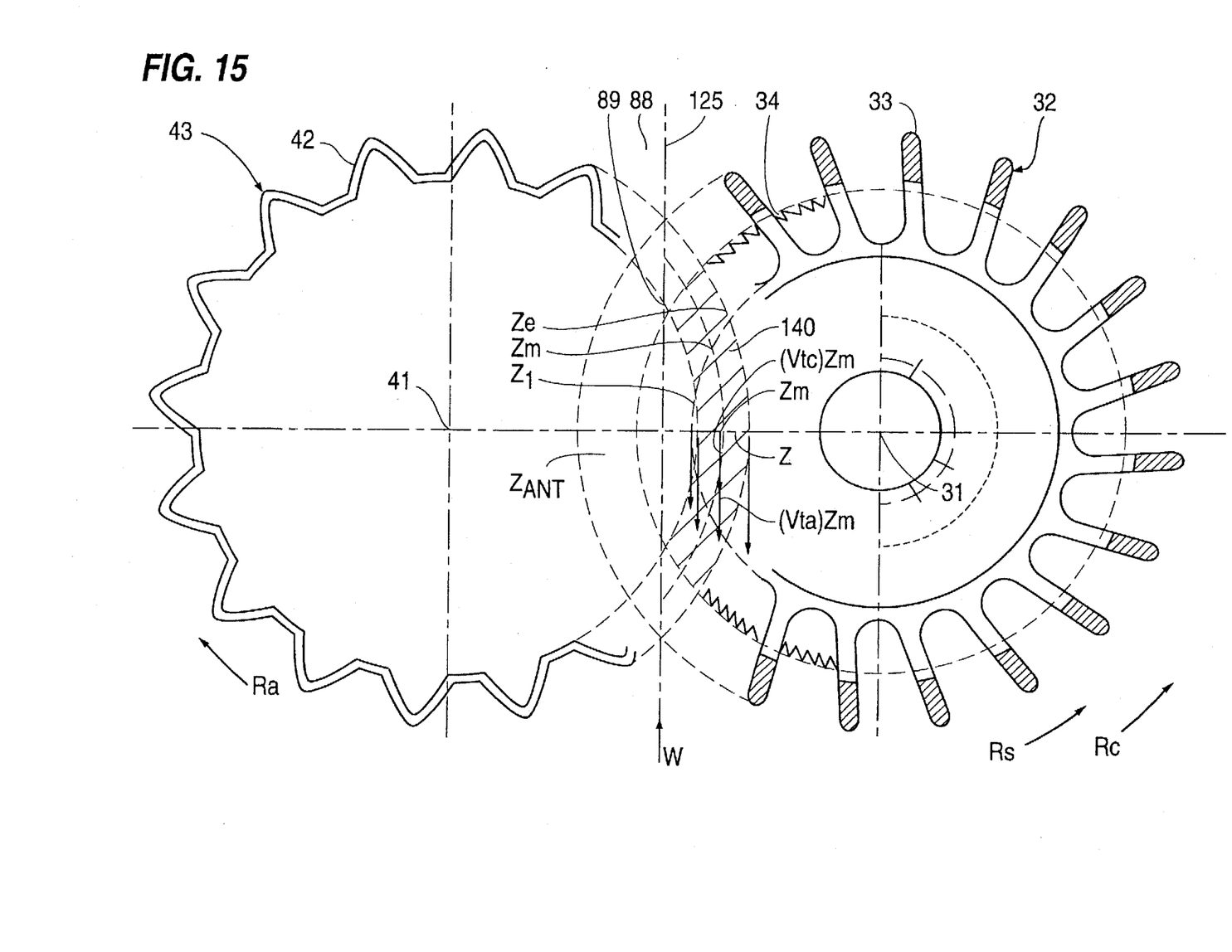
FIG. 15 is an explanatory diagram concerning the extraction of shoots.

Particular reference is made to FIG. 15 for the explanations which follow.

The principal solution involves reconciling two conditions.

The first condition, a framework condition known and applied in all cutting machines in the field under consideration, particularly of the pre-pruning type, concerns the tangential component of the rotation speed of the tools of each module (cages and feeders). At the periphery, or at least in the peripheral zone, this component must be equal to the forward speed $V_A$ of the pre-pruning machine. If $(Vt_c)_P$ is the tangential component of the rotation speed of the cages at their periphery (ends or zones close to the ends of the blades 36; cf. FIG. 7 and FIG. 8), and if $(Vt_a)_P$ is the tangential component of the rotation speed of the feeders at their periphery 49 (or in the nearby zone; cf. FIG. 9), this framework condition is translated by the at least approximate equality $(Vt_c)_P \cong (Vt_a)P \cong V_A$.

This relation helps ensure that the cutting tool 32 is well supplied (the conformation of the feeder of the cutting tool 42 seeks the same goal), that the posts are treated with care (object obtained in the first instance thanks to the previously described adjustable torque), to avoid tearing of shoots, and to preserve those shoots which are not destined to be severed.

The second condition is the result of numerous experiments and observations by the inventor.

As a preliminary, let it be noted that at points or places 89, intersection points of saws 34, of base of saws 43 of feeders 42 and wire 125 (the last-mentioned merged approximately with the working axis W), all the shoots are severed (of course, in FIG. 15, which is a view from above, it is seen as one single point or one single zone 89). In this area, it is therefore now a question of pulling or extracting from the wires (essentially the upper or the two or three wires) all those shoots which have remained attached by their tendrils.

For this extraction operation to be carried out, it is essential, at least in a zone 140—cf. also space Z in FIG. 5—that there should be, not equality, but on the contrary inequality between the respective tangential speeds defined above. In FIGS. 5 and 15, zone Z is represented by hatching, it being understood that the boundaries or exterior $Z_e$ and interior $Z_i$ limits of this space or zone 140 are very rough (the depth of the space Z being defined very approximately by the length of the teeth on the feeders 42). It should be observed that on known machines, the pulling away of the vine shoots is carried out from either side of the top wire 125, that is to say, either into zone Z or alternatively into zone $Z_{ANT}$ (see FIG. 15) symmetrical with zone Z with respect to wire 125. According to the invention, the operation of pulling away the vine shoots is localized in Z essentially, for a reason that will be given further on.

In order to simplify matters, examination will be limited to this area, more specifically Zm, it being understood that the limits of this area respectively of zone 140 are by no means precise, (they are, very approximately, defined by the length of the teeth of the feeders 42).

If $(Vt_c)_{Zm}$ is the tangential component in Zm of the rotation speed of the cages and $(Vt_a)_{Zm}$ the tangential component in Zm of the rotation speed of the feeders, the said condition of inequality is expressed by $(Vt_c)_{Zm} > (Vt_a)_{Zm}$ (more generally $(Vt_a)_Z > (Vt_c)_Z$ or $(Vt_a)_{140} > (Vt_c)_{140}$).

In other words, this inequality must be observed in all points at least in the zone or space Z, respectively 140 (cf. FIG. 15 and FIG. 5).

In order to obtain the above inequality, whilst respecting equality according to the framework condition, it is possible to make use of the rotation or angular speeds of the cages $(Vr_c)$ and the feeders $(Vr_a)$, or/and on the geometry of these organs, more specifically on the diameter of these organs.

The circuits according to both FIG. 13 and FIG. 14 make it possible, by means of the regulator-limiter 131, to adjust and/or vary $Vr_c$ and $Vr_a$. The output of the motor 100 supplying the motor 72 of the cages, the ratio of these angular speeds will be constant (same oil flow), i.e. $Vr_a/Vr_c = D$.

According to the described example, this ratio is less than 1, whereas the external diameter of a feeder is less than the diameter of a cage, so that in the zone Z $(Vt_c/Vt_a)_Z$ or $(Vt_c - Vt_a/Vt_a)_Z$ is always constant (the external diameter of a feeder, according to the example, being equal to about 90% of that of the cage).

As an illustration, according to the invention, the ratio $(Vt_a - Vt_c)/Vt_a)_{Zm}$, less than 1, i.e. in Zm, is about 0,25. It is in the region of 25% in Zi and about 0,50 in Ze.

With regard to the subsidiary (in this sens that it can be considered and adopted as a solution in isolation, without however being ideal on its own), or additional solution (in this sense that it can contribute to the quality of the outcome (by improving it), achieved by the means that have just been explained with regard to the relative speeds of cages/feeders and hence the operation of pulling the vine shoots away from the wires), this consists in considering the size of the parameter E mentioned towards the end of the explanations concerning FIG. 5 (distance between the lower/upper side of a tool of one module and the upper/lower side of a tool corresponding to the other module in interpenetration phase). This parameter is not to be chosen arbitrarily.

In cutting machines of the prior art, the severed shoots are, as a result of interpenetration, pushed, i.e. channeled in the direction of the axis of one and the other module alternately because the parameter E is too high.

On known machines as described in the introduction, the parameter E is of the order of 16 mm. (EP. 0,147,344) or of 12 mm. (FR 91.14502). It may readily be appreciated—particularly when (as in EP. 0,147,344) the tangential components of the rotation speeds of tools in the evacuation zone are virtually identical—that only a small proportion of the severed shoots will actually be extracted from the wires. As for the part played by the interpenetration in extracting the shoots, the greater the size of E the weaker and more arbitrary this will be.

That is why, according to the invention, the cutting machine which comprises a cutting head with two identical or quasi-identical cutting modules, each fitted with cutting tools (cages each accommodating a cutting device) or a cutting head having, as the one described here as an example, one cutting module and one module with feeder tools is characterized by the fact that in the interpenetration phase, the gap E between the upper/lower side of the cage of a module and a lower/upper side of the corresponding cage or feeder of the other module is less than 16 mm.

More advantageously, the cutting machine according to the invention is characterized in that the gap E in interpenetration phase between the upper/lower side of a given cage of the cutting module and the lower/upper side of a corresponding cage or feeder will be chosen in all events less than 12 mm. and, preferably, in the region of 7 to 9 mm.

Experiments have in fact shown that the optimum value E is about 8 mm. With E set to this value, and even the thickness of the teeth of the feeders 42 (reference 46 in FIG. 10), the severed and "twisted" shoots will be channeled principally into the zone 140, and thus exclusively near axis 31 (and not axis 41) (FIG. 15). In this way, any shoots which remained attached to the wires, despite the principal solution involving the tangential speeds which has just been provided, would be freed as a result of this complementary action.

The problem of cleaning the wires is therefore really and truly resolved.

It is quite clear, from the illustration above, that there are considerable advantages attached to these methods of driving and activating the modules and the jack. When the torques, previously adjusted thanks to an appropriate selection of pressures Pa, Pc in function of working conditions, are reached, due to the presence of posts, wire stretchers, vegetation tangled in the trellis or any other obstacle, and with the pre-pruning machine continuing to advance, in other words when these torques are neutralized as a result of these events, cages and feeders easily free themselves from these said objects by rolling over them, thanks to "slippage" in the drives: all risk of damage whether, in particular, to posts or to the tools fired in these modules is removed with a maximum of safety.

It may also be appreciated that these phases are carried out "gently" in two respects. Firstly, the fact that the pre-pruning machine is not subjected to any violent shock is a guarantee of reliability and long life irrespective of the intensity and conditions of use. Secondly, unlike the case of EP-0,147,344, posts and trellising do not come into contact with cutting blades or counter blades which are, moreover, submitted to a continually forced drive.

Pv, value of the admissible pressure on the jack, is also chosen and adjusted in function of the density of the vegetation; here again, the supports of the modules open when the thrust exerted on them exceeds the said value.

As a result of the inequality of the tangential speeds $Vt_a$ and $Vt_c$ between cages and feeders in a zone Z during interpenetration, the $Vt_a/Vt_c$ relation always being constant, the severed shoots are extracted perfectly from the wires, and at the same time, thanks to the device 50, the spurs are preserved when the machine is used in vines presenting cordon pruning. High-quality, uniform cutting is also ensured whatever the conditions of use of the machine according to the invention, particularly when forward speed is low, for example due to uneven land, the rotation speed of the cutting saws remaining constant and independent of this advancing speed.

Lastly, the original functional conception (torque on the tools adaptable to working conditions, constant ratio of angular and tangential speeds between cages and feeders) is strengthened by an equally ingenious construction concept permitting fast assembly and great reliability.

I claim:

1. A cutting apparatus comprising at least one cutting head, wherein said cutting head comprises:
   a shaft;
   at least one cutting tool disposed on said shaft;
   at least one guard disposed on said shaft, wherein each cutting tool is associated with a guard;

a first motor for rotating said at least one cutting tool; and a second motor for rotating said at least one guard independent of the rotation of said at least one cutting tool.

2. A cutting apparatus as claimed in claim 1, comprising:

a first cutting head; and a second cutting head;

wherein said first and second cutting heads are mounted respectively on a first arm and a second arm of a frame, where at least one of said arms is movably mounted on said frame between a first position at which said first cutting head and said second cutting head are separated, and a second position at which the at least one cutting tool of the first cutting head overlaps the at least one cutting tool of the second cutting head.

3. A cutting apparatus as claimed in claim 2, wherein:

said first and second cutting heads comprise a plurality of cutting tools; and at said second position the cutting tools of said first cutting head are between the cutting tools of said second cutting head.

4. A cutting apparatus as claimed in claim 1, further comprising at least one feeding head, wherein said feeding head comprises:

a second shaft;

at least one feeding tool disposed on said second shaft; and a third motor for rotating said at least one feeding tool.

5. A cutting apparatus as claimed in claim 4, wherein said feeding head and said cutting head are mounted respectively on a first arm and a second arm of a frame, where at least one of said arms is movably mounted on said frame between a first position at which said cutting head and said feeding head are separated, and a second position at which the at least one cutting tool of the first cutting head overlaps the at least one feeding tool of the feeding head.

6. A cutting apparatus as claimed in claim 5, wherein:

said cutting head comprises a plurality of cutting tools;

said feeding head comprises a plurality of feeding tools; and at said second position the cutting tools of said cutting head are between the feeding tools of said feeding head.

7. A cutting apparatus as claimed in claim 1, further comprising a control by which a torque or speed of said first or said second motor may be regulated.

8. A cutting apparatus as claimed in claim 4, further comprising a control by which a torque or speed of said third motor may be regulated.

9. A cutting apparatus as claimed in claim 4, wherein said at least one feeding tool comprises a disk having a plurality of teeth extending, in a plane of said disk, from a periphery of said disk.

10. A cutting apparatus as claimed in claim 9, wherein said teeth are pointed with the points making an angle of less than 90°.

11. A cutting apparatus as claimed in claim 4, wherein a torque of said second motor is less than a torque of said third motor.

12. A cutting apparatus as claimed in claim 1, wherein said at least one guard comprises, a housing in which is disposed a cutting tool, said housing having a plurality of extensions around a periphery, wherein said cutting tool is exposed between said extensions.

13. A cutting apparatus as claimed in claim 12, wherein said extensions are angled with respect to a radius of said cutting tool.

14. A cutting apparatus as claimed in claim 4, wherein said feeding head is supported between an upper arm and a lower arm of a frame; and further comprising a rotatable disk mounted below said lower arm.

15. A cutting apparatus as claimed in claim 14, wherein said rotatable disk is driven by said third motor through said shaft of said feeding head.

16. A cutting apparatus comprising:

at least one cutting head comprising;

a first shaft, at least one cutting tool rotatably disposed on said shaft, at least one guard rotatably disposed on said shaft, wherein each cutting tool is associated with a guard, and at least one feeding head comprising;

a second shaft, and at least one feeding tool rotatably disposed on said second shaft;

wherein said at least one guard is rotated at a speed less than a speed at which said at least one feeding tool is rotated.

17. A cutting apparatus comprising:

a first cutting head and a second cutting head, each cutting head comprising;

a shaft, at least one cutting tool rotatably disposed on said shaft, at least one guard rotatably disposed on said shaft, each cutting tool being associated with a guard, wherein said at least one guard of said first cutting head is rotated at a speed less than a speed at which said at least one guard of said second cutting head is rotated.

18. A mobile cutting apparatus comprising:

at least one cutting head comprising;

a first shaft, at least one cutting tool rotatably disposed on said shaft, and at least one guard rotatably disposed on said shaft, each cutting tool being associated with a guard;

wherein a tangential speed of said at least one guard at a periphery thereof is approximately equal to a translational speed of said cutting apparatus.

19. The cutting apparatus as claimed in claim 18, further comprising:

means for moving said cutting apparatus; and at least one feeding head comprising;

a second shaft, and at least one feeding tool rotatably disposed on said second shaft;

wherein a tangential speed of said at least one feeding tool at a periphery thereof is approximately equal to a translational speed of said cutting apparatus.

20. A cutting apparatus comprising:

a frame having an upper arms and a lower arm; and at least one feeding head comprising:

a shaft, at least one feeding tool disposed on said shaft, and a motor for rotating said at least one feeding tool, wherein said feeding head is supported between said upper and lower arms; and a rotatable disk mounted below said lower arm.

21. A cutting apparatus as claimed in claim 20, wherein said rotatable disk is driven by said third motor through said second shaft of said feeding head.

22. A cutting apparatus as claimed in claim 20, wherein said rotatable disk is not driven.

23. A cutting apparatus comprising at least one cutting head comprising:

a shaft;

a plurality of cutting tools disposed on said shaft;

a plurality of guards disposed on said shaft, each cutting tool being associated with one of said guards; and a plurality of first and second boxes which are disposed on said shaft, wherein one first and one second box are attached to each other and provided between an associated cutting tool and guard, and an adjacent associated cutting tool and guard;

wherein each said first box is attached to a guard which guard is positioned above said attached first box, and each said second box is attached to a guard which guard is positioned below said attached second box.

* * * * *